United States Patent
Toumazou et al.

(10) Patent No.: US 11,645,327 B1
(45) Date of Patent: May 9, 2023

(54) PROVISION OF ALTERNATIVE MEDIA CONTENT

(71) Applicants: Christofer Toumazou, London (GB); Yue Wang, Melbourne (AU)

(72) Inventors: Christofer Toumazou, London (GB); Yue Wang, Melbourne (AU)

( * ) Notice: Subject to any disclaimer, the term of this patent is extended or adjusted under 35 U.S.C. 154(b) by 0 days.

(21) Appl. No.: 17/566,051

(22) Filed: Dec. 30, 2021

(51) Int. Cl.
*G06K 7/14* (2006.01)
*G06F 16/532* (2019.01)
*G06F 16/951* (2019.01)
*G02B 27/01* (2006.01)
*G06F 16/583* (2019.01)

(52) U.S. Cl.
CPC ......... *G06F 16/532* (2019.01); *G02B 27/017* (2013.01); *G06F 16/5846* (2019.01); *G06F 16/5854* (2019.01); *G06F 16/951* (2019.01); *G02B 2027/014* (2013.01); *G02B 2027/0138* (2013.01)

(58) Field of Classification Search
CPC .... G06V 10/768; G06V 10/993; G06V 20/30; G06V 30/10; G06V 30/262; G06V 40/172; G06V 30/133; G06V 30/413; G06V 30/418; G06V 10/235; G06V 20/10
See application file for complete search history.

(56) References Cited

U.S. PATENT DOCUMENTS

| 2011/0035406 | A1* | 2/2011 | Petrou | G06F 16/438 |
| | | | | 707/769 |
| 2018/0174369 | A1* | 6/2018 | Ma | G06V 20/20 |
| 2020/0410554 | A1* | 12/2020 | Hertel | G06Q 20/308 |

OTHER PUBLICATIONS

Augmented Images for Android NDK, https://developers.google.com/ar/develop/c/augmented-images, updated Dec. 13, 2021, 6 pages.
More to Explore with ARKit 5, https://developer.apple.com/augmented-reality/arkit, Dec. 2021, 4 pages.

* cited by examiner

*Primary Examiner* — Michael J Vanchy, Jr.

(57) ABSTRACT

A computer implemented method is for providing user devices with alternative content. The method includes: defining a plurality of search parameters; crawling the world wide web or selected parts thereof, or searching predefined web sites, to identify content matching one or more of said search parameters; generating image triggers by extracting the identified content or generating digital fingerprints indicative of the identified content; storing the image triggers in a database, together with respective alternative content or alternative content identifiers; receiving an image captured from a printed or displayed medium at an end user device; searching the captured image to identify a presence of at least one of the image triggers in the captured image; and causing alternative content corresponding to the at least one of the image triggers to be displayed or presented at the end user device, or a respective other device associated with the end user device.

8 Claims, 4 Drawing Sheets

PROVISION OF ALTERNATIVE MEDIA CONTENT

TECHNICAL FIELD

The present invention relates to a method of providing alternative media content to client devices and in particular to a method which recognises, from captured images, predefined media content and uses this as a trigger to provide alternative media content.

BACKGROUND

Despite the growth of the Internet, printed media remains a significant platform for providing news, opinions, and other topical articles to society. It is often desirable however to provides readers with a means to access, via the Internet, other content to supplement printed articles, for example to provide further elucidation or to provide a different viewpoint. Such content is referred to hereinafter as "alternative media content" or "alternative content". This might be achieved of course by including a web link (URL) in the article which, when entered into a browser on a user's device, for example a smartphone, will cause the browser to load the alternative content into the browser. It might also be envisaged that a QR code or similar be printed with the article which, when scanned by a user's device, causes the alternative content to be loaded into a device browser. Both of these approaches however leave control of the alternative content largely with the publisher of the printed media.

SUMMARY

It is desirable to provide a means of providing alternative media content to readers of printed articles and the like which is related to the articles but which is not necessarily under the control of the printed media publishers.

According to a first aspect of the present invention there is provided a computer implemented method of providing user devices with alternative content. A computer implemented method is for providing user devices with alternative content. The method includes: defining a plurality of search parameters; crawling the world wide web or selected parts thereof, or searching predefined web sites, to identify content matching one or more of said search parameters; generating image triggers by extracting the identified content or generating digital fingerprints indicative of the identified content; storing the image triggers in a database, together with respective alternative content or alternative content identifiers; receiving an image captured from a printed or displayed medium at an end user device; searching the captured image to identify a presence of at least one of the image triggers in the captured image; and causing alternative content corresponding to the at least one of the image triggers to be displayed or presented at the end user device, or a respective other device associated with the end user device.

The step of crawling is performed to identify content that does or is expected to appear in a printed form, and the image is captured from the printed medium using a camera or scanner of the end user device.

The step of searching the captured image to identify the presence of the at least one of the image triggers is carried out at the end user device. The image triggers and respective alternative content or alternative content identifiers are stored in a network database of a server or coupled to a server, and the method further includes sending the image triggers, or selected subsets of the image triggers, to the end user device.

The method may include sending the respective alternative content or the alternative content identifiers to the end user device together with the image triggers.

The step of searching is implemented on the end user device by an Augmented Reality, AR, core.

The step of searching the captured image to identify the presence of at least one of the image triggers is carried out at a network server, and the method comprises sending the captured image, or parts thereof, from the end user device to the network server.

The method may include displaying the alternative content at the end user device, or at the other device, as Augmented Reality content either on a camera view display or on a transparent display.

The end use device includes one of a smartphone, a tablet, a smartwatch, or a smart glasses.

The identified content includes a text article, a text headline, a photograph, a graphic, or any part thereof.

Each of the image triggers includes a text string, and the step of searching the captured image includes searching the captured image for a text string by preforming optical character recognition on the captures image or parts thereof.

The term "image" is considered to encompass both 2D and 3D pictures as well as 2D and 3D video sequences.

DETAILED DESCRIPTION

Figure 1:
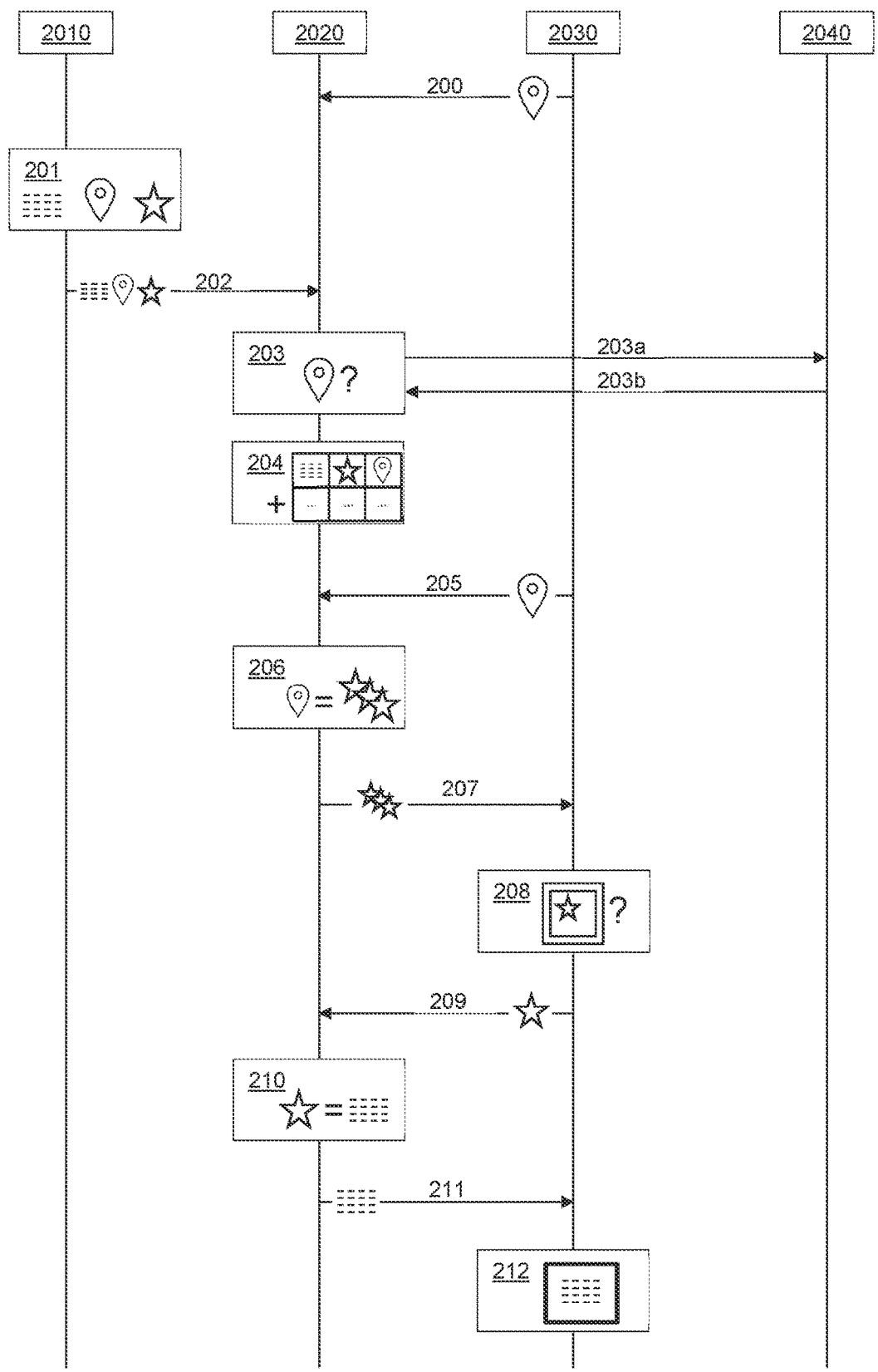
FIG. 1 is a diagram of a content distribution flow in an exemplary method.

The following disclosure is concerned by way of example with a content distribution application or "app", in which content may be associated with location data and image "tags" or "triggers". In response to capturing an image of an image trigger in a given location, consumers can be served with particular content, i.e. alternative media content, which may then be viewed via a consumer device interface. Specifically, image triggers are triggers associated with articles, pictures and the like, and which are contained within, or are otherwise derivable from, printed media such as newspapers, journals, flyers, posters, billboards, etc.

In the context of mobile devices such as smartphones, it is known to provide so-called Augmented Reality (AR) functionality to provide for enhanced user experiences. This functionality is referred to hereinafter using the generic term "AR core". For example, Android™ provides as an AR core its ARCore that allows developers to build apps that can detect and augment images within an image field captured by a device's camera.

In use, an app installed on the Android device provides a number of image triggers to the ARCore functionality of the device (a combination of hardware features and code of the operating system) using the ARCore API, and the functionality searches for these triggers in a captured image. ARCore is able to detect triggers largely independent of orientation and relative size. The ARCore functionality of the device signals the detection of a trigger to the instructing app, via the API. The app can then, for example, overlay additional media on the displayed image (e.g. captured field). This is described for example at: https://developers.google.com/ar/develop/c/augmented-images. Apple™ iOS provides for similar AR core functionality with its ARKit: https://developer.apple.com/augmented-reality/arkit/. The solution described here, when implemented on a smartphone or similar device, may make use of such AR functionality. Specifically, the app referred to above may interface with the AR core functionality of the device using the AR core API appropriate to the used device type/operating system.

An example app is the currently available ZOME™ app (or a modified version thereof), available for example from the Apple™ App Store and Google™ Play Store. ZOME may be considered as an exemplary "component" of the client device and provides for location based messaging where messages can be overlaid on a camera-captured video stream in an AR style. It includes, or is modified to include, the necessary AR core API (typically, device manufacturers or operating system providers make available Software Development Kits with the information necessary to integrate and use the APIs in their apps). Other example apps might include modified versions of the Pokémon™ and IKEA™ apps.

In order to use the additional functionality, the modified app is opened and the camera/AR view selected. If not already done, the app will send a location update to a service specific server, and the server will provide to the app a corresponding locally relevant subset of image triggers together with respective content identifiers or content for caching locally. The app will in any case send periodic location updates to the server. Of course other embodiments will be envisaged within the scope of the invention, including those where the app, or some of its functionality, is provided as embedded functionality with a device/operating system or as a browser plug-in.

Figure 2:
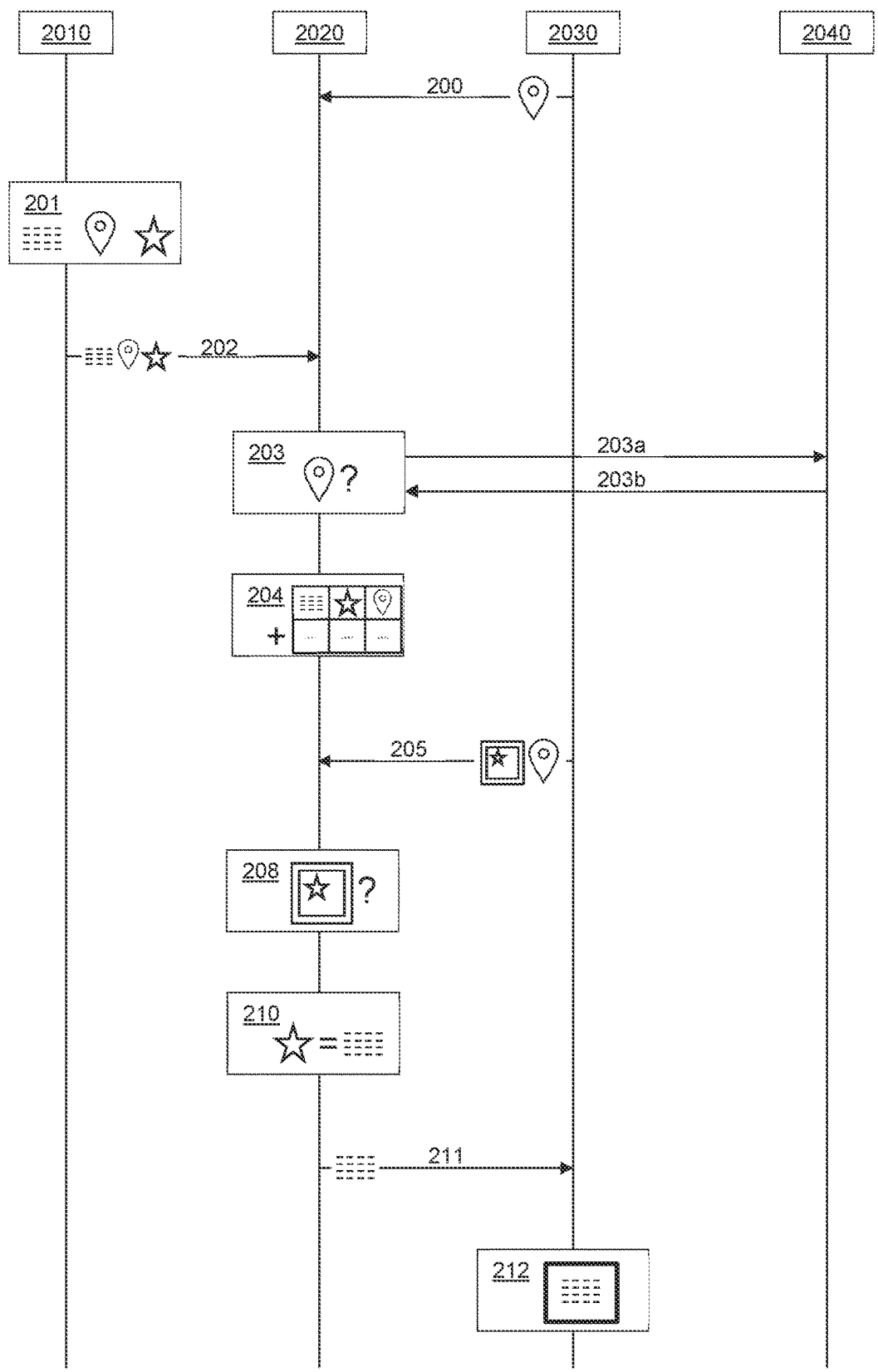
FIG. 2 is a diagram of a content distribution flow in an alternative exemplary method.
Figure 3:
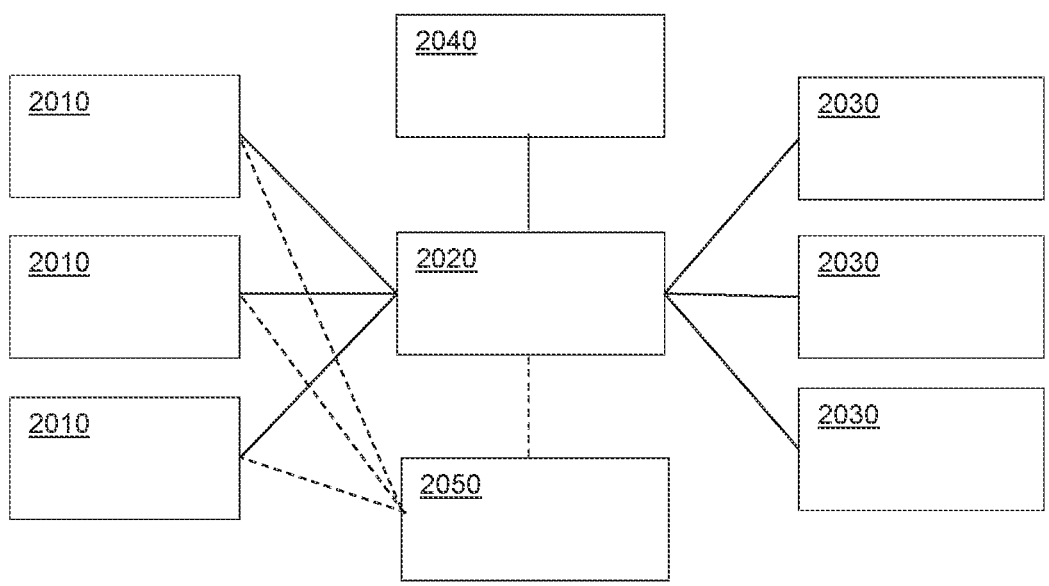
FIG. 3 is a network diagram showing connections between the entities involved in FIGS. 1 and 2.

In order to illustrate the proposed solution, a general description of the component functionality and interaction (with other components) will now be provided with reference to FIGS. 1 and 2, which illustrate exemplary content distribution flows, and FIG. 3, which shows an exemplary network on which this method could be implemented.

The network comprises a plurality of sending clients 2010, a server 2020 (which may be a server cluster or server cloud), a plurality of receiving clients 2030, and a server including web mapping service 2040. The sending client 2010 may also be capable of receiving, and the receiving client 2030 may also be capable of sending—the names simply refer to their roles in the method presented. The clients 2010, 2030 may be smartphones, tablets, PCs, wearables including wrist worn devices, etc. Connectivity between clients 2010, 2030, the server 2020, and the web mapping service 2040 is provided by any suitable communications network(s). For example, the clients 2010, 2030 may be connected to the Internet via cellular or WiFi networks, whilst the server 2020 and mapping service 2040 may be coupled to the Internet via an enterprise network and a broadband network.

Referring to FIG. 1, in step 200, each receiving client 2030 periodically sends its location to the server 2020. This might result from a user opening the app on his or her device, or selecting a refresh option. Alternatively, the app may provide background updates periodically (for example every 5 or 10 minutes) without requiring specific user input.

In step 201, one of the sending clients 2010 generates content or a first content identifier to be distributed to intended recipients herein referred to as consumers (the users of the receiving clients 2030 are considered to be consumers of the content). Businesses, persons or other organisations may pay a subscription to use this service (via their respective sending clients 2010), or may pay on a per-message basis, or using some other payment model.

Each piece of content or first content identifier is associated with a location search term, and an image trigger [in FIG. 1, contents or first content identifiers are represented by dashed lines, location search terms and locations are represented by location "pin" icons, and image triggers are represented by stars]. In an example, contents or first content identifiers, as well as the associated location search terms and image triggers, may be generated on a separate user device, and uploaded to the sending client device 2010. Alternatively, uploaded content or content identifiers may be tagged with a location search term at the server, e.g. based upon information associated with a sender's subscription.

Contents may include various multimedia contents, e.g. any combination of text, images, video, audio, live stream or chat, documents, representations of 3D objects, additional location data (i.e. a location other than the associated content location described herein), etc. A suitable first content identifier may comprise for example a URL, or any other data capable of directing a consumer or consumer device 2030 to a piece of content. As is discussed in more detail below, the image triggers are associated with content, e.g. articles, images, etc, appearing in printed media.

The location search term comprises information capable of designating a "content location". The content location may indicate a geographical location of the associated image trigger, or may specify a geographical location from which a consumer device 2030 can access the content upon capturing an image of the trigger (these locations may or may not be equivalent). For the purposes of the present disclosure, unless otherwise stated, the term "location" is considered to refer to both a specific point location, as well as a location range or region. In particular, the location search term is capable of being searched by a service application programming interface (API), such as the Google™ mapping service API, to identify the content location. In some examples, the sending user may wish to associate a single piece of content with multiple locations. In this case, the location search term may be capable of defining a multiplicity of locations (e.g. up to 10,000 or more).

In step 202, the sending client 2010 sends the content or first content identifier, the location search term, and the image trigger to the server 2020. This may be done using a "business platform" interface or website having a field or fields for each of the content, the location search term, and the image trigger.

In step 203, the server 2020 identifies the content locations associated with the location search term. These might be, for example, specific towns or cities or regions (or countries), their GPS or geographic coordinates, i.e. latitude and longitude (ranges), or another suitable representation. The server 2020 may perform this step by submitting (203a) the location search term using an appropriate API 2040, such as the Google™ mapping service application programming interface (API), to perform a search using the location search term. The server 2020 then receives (203b) a results list including one or more content locations.

In step 204, the server 2020 adds the content or first content identifier, the image trigger, and the one or more content locations to a distribution database or a set of linked databases that is or are searchable by location (collectively referred to herein as an "Atlas database", and depicted in FIG. 1 as a table). As further contents are sent by the same or different sending users, the respective contents, locations and triggers are identified by the server 2020 and the Atlas database updated. The result is an Atlas database containing multiple locations associated with various contents and corresponding triggers. It will be appreciated that the Atlas creation process is dynamic, and that the location of step 204 in the flow is merely exemplary. For example, a local "lightweight" Atlas database may also be installed on the consumer device 2030 to allow for some limited localized mapping and images. This may improve functionality when the consumer device's network connection is poor, for example.

In step 205, the server 2020 receives a further consumer update request including a location of the consumer device from a given receiving client 2030. In step 206, the server 2020 searches the Atlas database using the location of the consumer device to identify any contents or first content identifiers having content locations that correspond to the consumer device's location, and will obtain the associated image trigger or triggers. These triggers are then sent to the consumer device 2030 (step 207).

Each trigger sent to the consumer device 2030 may be accompanied by a "second" content identifier [the term "second" in this context merely serves to distinguish the content identifier sent to the consumer device 2030 in step 206, from the "first" content identifier which may be provided by the sending user in steps 201-202]. The second content identifier allows the network to identify contents associated with a detected image trigger, in order to serve said contents to the consumer device 2030. For example, the content identifier may be a unique reference number (URN) for use by the network in conjunction with the Atlas database. It will also be appreciated that, where the sending user provides a first content identifier to be distributed to the consumer devices 2030, the second content identifier may be the same as the first content identifier. The content may of course be provided directly to the consumer device for local caching, or the local device may pre-load the content using the provided content identifier(s). Pre-caching of content will likely allow for a faster response time when an image trigger is identified by the consumer device.

The location of the consumer device 2030 may not necessarily have to correspond exactly to the content location in order for the associated image trigger to be obtained in step 206. In particular, an image trigger may be obtained when the consumer device's location lies within a predetermined detection range of the content location. In one example, each piece of content may have an associated adjustable predetermined detection range. The extent of each detection range is not particularly limited, but may be relatively small (e.g. a 100 m, 50 m, or smaller radius centred on the content location) for "standard" messages. This greatly reduces the number of image triggers in the Atlas database which are required to be searched for matches to an image captured by a consumer device 2030 in a particular location, improving the speed and accuracy of content delivery (particularly as the number of sending users and contents increases over time). To ensure fast and reliable trigger identification and content delivery, the number of image triggers supported by the app may be limited within a given area. For example, for any given area defined by a 50 m radius, the number of supported image triggers may be limited to 100 or less.

A number of "global" pieces of content may also be supported, which are servable to a consumer device 2030 at any location worldwide. Of course, each piece of "super-sized" and "global" content constitutes one of the available image triggers for a given location, therefore their numbers may be restricted (e.g. 100 pieces of "super-sized" content per city, or only 1 to 5 pieces of "global" content may be supported at any time).

The detection range and the maximum number of pieces of content supported within a given radius, as well as the maximum number of pieces of "super-sized" and "global" content, can be increased or decreased depending on various factors, for example improvements in the capabilities of consumer device hardware and mobile networks. The standard detection range may also be adjusted on a region-by-region basis, for example with a greater radius in regions having fewer trigger images and vice versa.

In step 208, the consumer device 2030 performs an image recognition process on image data (depicted in FIG. 1 as a frame) captured by the consumer device 2030, to identify the presence of one or more of the image triggers obtained in step 206. By way of example, the user may direct the device's camera at the front page of e newspaper or a specific article or headline within that page.

It will be appreciated that the captured image data may not necessarily need to comprise an exact match to the image trigger supplied in step 201 in order to be recognised as corresponding to said trigger. That is, an image trigger may be identified within a piece of captured image data if a predetermined similarity threshold is exceeded. This allows for a single image trigger to cover various modifications which may be made to the physical trigger at the real-life location. For example, where the image trigger is or represents a colour photograph, a captured image of a product with different colour variations, or a black and white photograph, may also be recognised as corresponding to the trigger. Similarly, the similarity threshold may be configured to accommodate for minor feature differences (additions or omissions), making the method robust to the evolution of the physical triggers, for example due to dirt/wear and tear on the printed media.

If the presence of any of the image triggers is detected, the consumer device 2030 may send the corresponding second content identifier to the server 2020 in step 209 (if the content has not been previously cached locally), and the method proceeds to step 210. Sending a content identifier (e.g. as opposed to returning the identified image trigger to the server 2020) helps to reduce the bandwidth requirements of the method, improving speed and efficiency. Of course, if the second content identifier corresponds to a first content identifier provided by the user in steps 201-202, the method may proceed directly to step 212.

In step 210, the server 2020 uses the second content identifier received from the receiving client 2030 to retrieve contents or a first content identifier corresponding to the detected trigger image, and sends the content or the first content identifier to the consumer device 2030 (step 211).

In step 212, the content or first content identifier may be displayed by the consumer device 2023. Content may be displayed at the consumer device 2030 in a number of ways, depending upon factors such as the nature of the consumer device 2030, and the format of the message content. In one example, the message content is displayed by augmented reality (AR) display. An AR display is one which overlays display graphics on a real world environment. There are broadly two types of augmented reality displays. In the first type, display graphics are overlaid on an image (generally a live image) taken from a camera. This is the type commonly seen on AR apps for smartphones. In the second type, graphics are displayed on a transparent or translucent display, which the user can look through to see the real world beyond. This type is used for AR headsets, "smart glasses", or "smart windows", and has been proposed for "smart contact lenses". The above disclosure could apply to any of the AR examples given, and will also be applicable to future AR technologies with appropriate modification including holographic displays.

In one example, a content notification may be displayed by the consumer device 2030, awaiting input from the consumer to display the content. Content may also be associated with a passcode, such as a password or PIN code, such the content can only be viewed or accessed after a receiver has entered the passcode into his or her device. The passcode may be derived from biometric data such as a fingerprint or the image of a face. In the case of a password, the user's device may provide a means for recovering a forgotten password, such as by way of displaying a password hint.

It will be appreciated that the receiving client 2030 may or may not be the same device on which the contents may ultimately be displayed. For example, a consumer may have multiple consumer devices which are "paired", for example a smart-phone in communication with a smart-watch (or other smart-accessory such as glasses or contact lenses) via Bluetooth. A first consumer device (e.g. the smart-phone) may carry out one or more of the method steps of the receiving client 2030 as described herein (e.g. providing consumer update requests to the sever 2020 (steps 200, 205), receiving image triggers or contents from the server (steps 207, 211), performing image recognition (step 208), or sending second content identifiers to the server 2020 (step 209). Meanwhile, a second consumer device (e.g. the smart-watch) may perform any remaining method steps, or may simply function as a consumer interface and display for contents served to the first consumer device.

The skilled person will appreciate that a number of modifications may be made to the method as described herein. For example, FIG. 2 illustrates an alternative content distribution flow, wherein the further consumer update request sent in step 205 includes image data captured by the consumer device. The image recognition step 208 is then carried out at the server or cloud server 2020, before proceeding to step 210 as described above.

While the above examples have referred to a "sending client" and a "server", the messages may be directly created at the server 2020, rather than being originally obtained from a sending client 2010. For example, this may occur in a setup where an advertiser instructs the operator of the server 2020 to generate a message on their behalf.

Turning now to use of the solution described above for the provision of alternative media, as has already been considered this can involve the use of image triggers that allow matching to content within printed media. An example might be where the image trigger matches to a specific article printed in a newspaper or magazine. The trigger might be a digital facsimile of the article or a part of the article, for example headline text or a photograph or other graphic of the article. The trigger could be generated in part by a manual exercise of scanning or photographing a page or part of a page of the newspaper or magazine and cropping the captured image to contain only the article, or part of the article, of interest. The image trigger is then uploaded to a server by the sending client, together with a location search term. In this case the term might simply be a city, region or country where the newspaper or magazine is likely to be sold. This may or may not require a further lookup to the web mapping service. The image trigger and location(s) are saved to the Atlas database and are subsequently provided to one or more receiving clients using the procedures described above. When the app on the client device recognises the image trigger in a captured scene, e.g. as a user points the device's camera at a page of the newspaper or magazine, the associated alternative content is presented to the user on the device's display. This can be done in any suitable format, e.g. by replacing the image in the current display with the content or by presenting it as AR content over the current display. Of course the alternative content might be played out as an audio feed. The display may also, as noted above, be a transparent display such as a pair of smart glasses.

It will be appreciated of course that providing the image triggers as images of the actual articles of interest may be inefficient and/or may give rise to legal issues. As an alternative, image triggers may act as a digital "fingerprints", for example being generated from the original images by compression or encryption, or hashing. Alternatively, one might consider generating a digital fingerprint using metrics such as the number of lines and paragraphs in an article and/or the relationship of the article to other content of a printed page. Providing that a digital fingerprint of the image captured by the client device is generated using the same mechanism, matching remains possible. It is also possible that the image triggers may comprise text, e.g. generated by applying Optical Character Recognition (OCR) to the original image. By applying OCR to the image captured by the client device and comparing the resulting text to that of the image trigger, again matching is possible.

It is desirable that, to be commercially viable, the mechanism for providing alternative media is scalable. It might, for example, be difficult or impractical for the service provider, or subscribing end user, to obtain and photograph or scan images from many different printed publications in many different locations. A solution may be to look at Internet publications associated with the printed media. A significant proportion of printed media is available in digital form online, particularly in the case of newspapers which are likely to have the widest readership, even if the web sites are behind a paywall. It is therefore proposed to provide a means to access such online sites and extract appropriate content from which the image triggers can be generated or to generate image triggers directly from the identified online content. This can be an automated process whereby a server (Internet "spider" indicated by reference numeral 2050 in FIG. 3) crawls the Internet (www) to identify relevant content, or accesses predefined sites to do this, and generates the necessary image triggers and locations. By way of example, an end user might subscribe to a service that searches daily for content appearing in certain publications, e.g. major national newspapers, and relating to a specified media personality. The generated image trigger(s) may then the provided to a sending client to be uploaded to the server. Alternatively, this functionality may be integrated into the server or provided directly to that server. Receiving clients will then receive appropriate image triggers, possibly dependent upon their locations, together with respective content identifiers or content.

Figure 4:
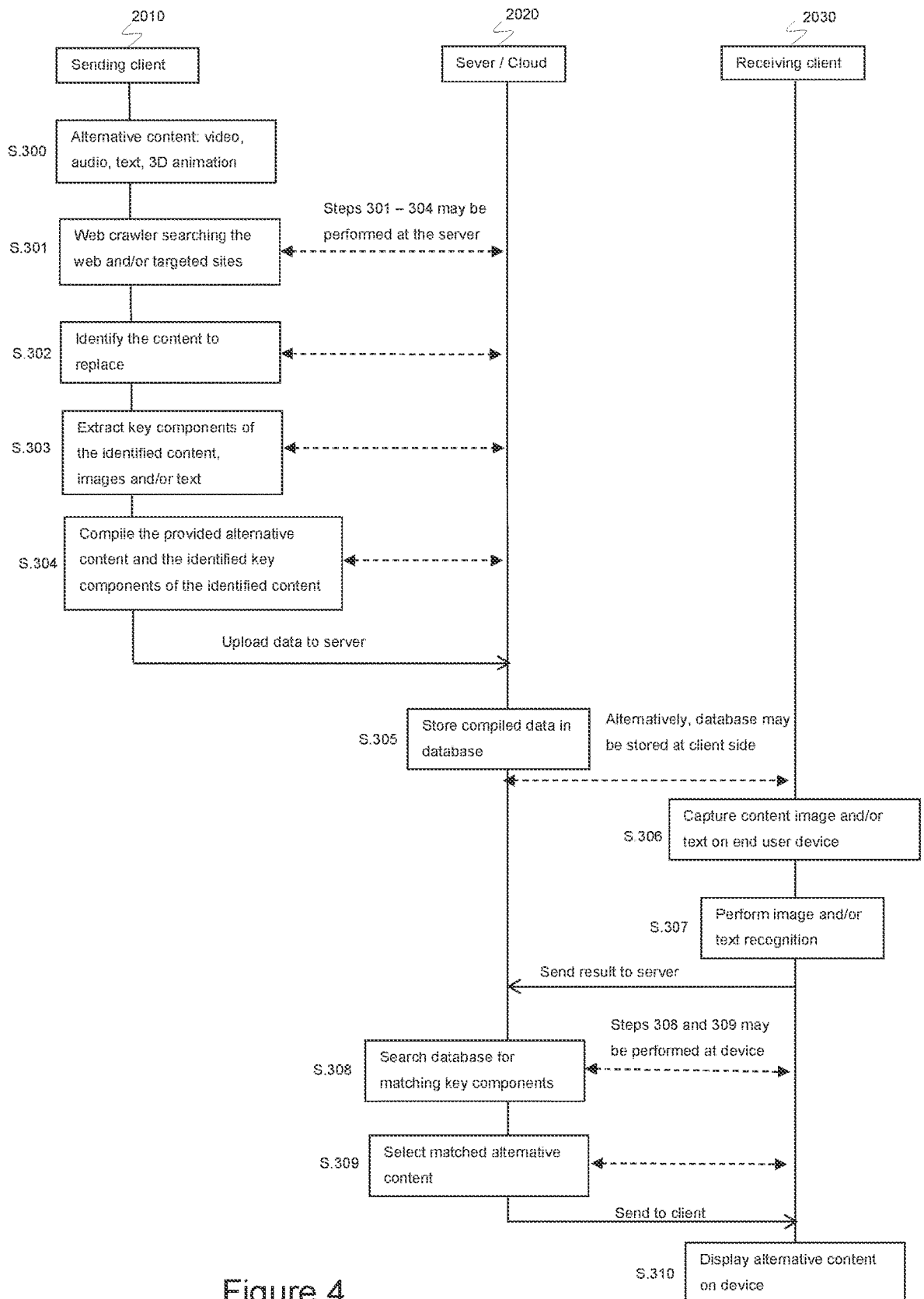
FIG. 4 illustrates and extended flow to enable the provision of alternative media to user devices.

This mechanism for serving alternative media content to end users is further illustrated in FIG. 4, where the sending client is identified by numeral 3010, the server by numeral 3020, and the receiving client or consumer device by numeral 3020. Specifically, FIG. 4 illustrates the following sequence:

300: Alternative content is generated or obtained at the sending client.

301: A web spider crawls the www and or targeted sites for content of interest.

302: Content of interest is identified.

303: Image triggers are identified from that content and or generated, e.g. as digital fingerprints.

304: Data is compiled comprising the image triggers and the respective alternative media content or content identifiers, optionally including locations or location identifiers, and the data is uploaded to the server.

305: The server stores the uploaded data in the Atlas database, optionally after performing a lookup using the web mapping service API to map location identifiers to one or more specific locations. Image triggers and, optionally content or content identifiers may be provided to the receiving client.

306. A user of the receiving device captures an image (or text) from a printed publication.

307. The receiving device performs image or text recognition on the captured image or text and sends the result to the server. In some embodiments, the receiving device sends the image to the server for the server to perform image or text recognition on the captured image or text.

308. The server searches the Atlas database for matching image triggers.

309. If a matching image trigger is identified, the server identifies the alternative media content and sends this to the receiving client.

310: The receiving client presents the alternative media content in the desired manner.

As is noted in FIG. 4, various of the steps may be performed at entities other than those indicated. For example, and as noted above, the crawling operation may be performed at the server, whilst the matching of image triggers may be performed at the receiving client.

Whilst the invention has been described above in the context of identifying image triggers in printed media, the invention also has applications to non-printed media. For example, a user may capture images from another screen as a colleague's PC display and the captured image may be searched for the image triggers. Embodiments are also envisaged where the contents of a user's own screen is searched for image triggers. This might, for example, be implemented using a browser plug-in.

The invention claimed is:

1. A computer implemented method of providing user devices with alternative media content, the method comprising:
defining a plurality of search parameters;
crawling world wide web or selected parts thereof, or searching predefined web sites, to identify content matching one or more of the search parameters;
generating image triggers by extracting the identified content or generating digital fingerprints indicative of the identified content;
storing the image triggers in a network database of a server or coupled to a server, together with respective alternative media content or alternative media content identifiers and respective location search terms;
receiving a location update from an end user device and using the location update to identify a set of locally relevant image triggers within a range of the updated location, wherein the range of the updated location is adjusted according to an amount of the locally relevant image triggers to obtain updated locally relevant image triggers;
sending the updated locally relevant image triggers to the end user device;
at the end user device,
receiving the updated locally relevant image triggers;
receiving an image captured from a printed or displayed medium;
searching the captured image to identify a presence of at least one of the received updated locally relevant image triggers in the captured image; and
in response to identifying the presence of at least one of the received updated locally relevant image triggers in the captured image, displaying or presenting alternative media content corresponding to the at least one of the received updated locally relevant image triggers at the end user device, or at a respective device associated with the end user device.

2. The computer implemented method according to claim 1, wherein crawling the world wide web or the selected parts thereof or the searching the predefined web sites is performed to identify content that does or is expected to appear in a printed medium, and the image is captured from the printed medium using a camera or scanner of the end user device.

3. The computer implemented method according to claim 1, further comprising sending the respective alternative media content or the alternative media content identifiers to the end user device together with the updated locally relevant image triggers.

4. The computer implemented method according to claim 1, wherein searching the captured image is implemented on the end user device by an Augmented Reality (AR) core.

5. The computer implemented method according to claim 1, further comprising displaying the alternative media content at the end user device, or at a respective device associated the end user device, as Augmented Reality content on a camera view display or on a transparent display.

6. The computer implemented method according to claim 1, wherein the end use device includes one of a smartphone, a tablet, a smartwatch, or a smart glasses.

7. The computer implemented method according to claim 1, wherein the identified content includes a text article, a text headline, a photograph, a graphic, or at least a part thereof.

8. The computer implemented method according to claim 1, wherein each of the image triggers includes a text string, and searching the captured image comprises searching the captured image for the text string by preforming optical character recognition on the captured image or parts thereof.

\* \* \* \* \*